July 4, 1939.  R. G. GUTHRIE ET AL  2,164,403
METHOD OF AND MEANS FOR REFORMING GASES
Filed March 31, 1937
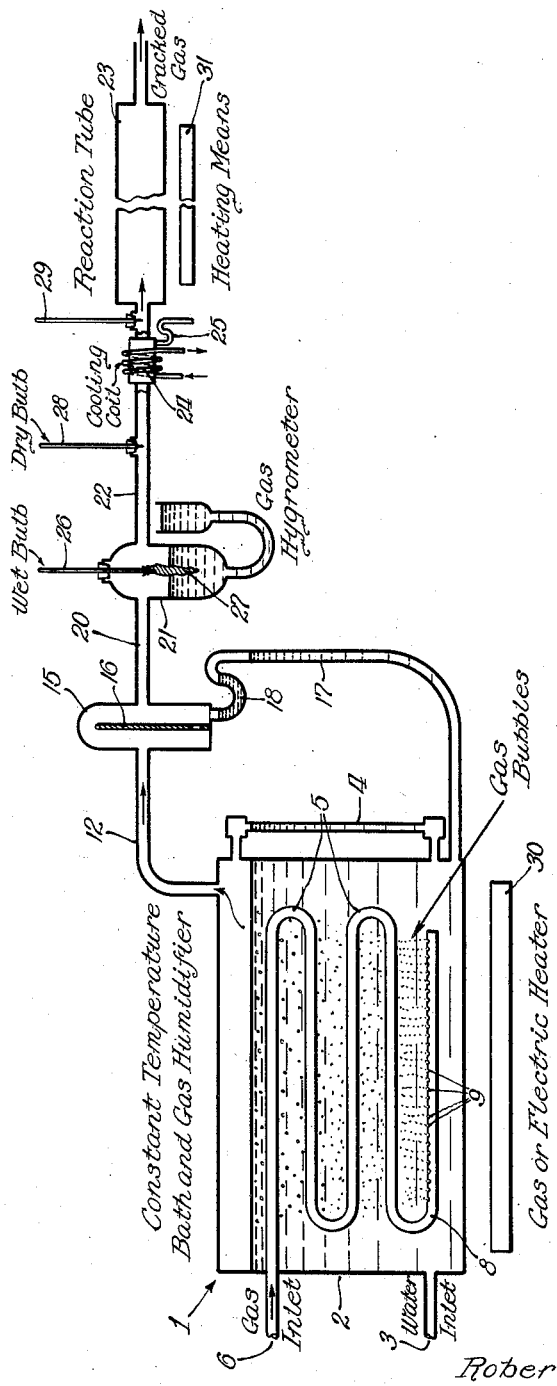
Inventors:
Robert G. Guthrie
Oscar J. Wilbor Patented July 4, 1939

2,164,403

UNITED STATES PATENT OFFICE 2,164,403

METHOD OF AND MEANS FOR REFORMING GASES

Robert G. Guthrie and Oscar J. Wilbor, Chicago, Ill., assignors to Peoples Gas By-Products Corporation, Chicago, Ill., a corporation of Illinois Application March 31, 1937, Serial No. 134,071

5 Claims. (Cl. 23—5)

The present invention relates generally to the reforming of gases, such as ordinary manufactured gas, natural gas, and other gases containing relatively large proportions of methane and ethane, into a final gas consisting essentially of hydrogen, carbon monoxide and nitrogen. A particular use for the gas so produced is its employment as an atmosphere in the so-called "bright heat treatment" of metals. Reforming of such a gas may be accomplished by injecting or mixing water, water vapor, or steam into the gas to humidify it, which is necessary to promote the final water-gas reaction, and passing the mixture through a chamber heated to about 1800° F.

One type of gas with which we are familiar has the following composition:

|  | Percent |
|---|---|
| $CO_2$ | 1.2 |
| Ill | 1.9 |
| $O_2$ | 0.2 |
| CO | 2.0 |
| $H_2$ | 23.2 |
| $CH_4$ | 56.3 |
| $C_2H_6$ | 7.5 |
| $N_2$ | 7.6 |

After such a gas has been humidified and passed through a chamber heated to approximately 1800° F., the result is a gas having from 50% to 75% hydrogen, 15% to 25% carbon monoxide, with any residual being nitrogen.

The reaction occurring with the moist gas in the generating tube is the well known water-gas reaction:

$$CH_4 \text{ plus } H_2O = CO \text{ plus } 3H_2$$
$$C_2H_6 \text{ plus } 2H_2O = 2CO \text{ plus } 5H_2$$

In the past, various means have been used to inject or mix water, water vapor, or steam with a gas to humidify it, but so far as we are aware no means or methods were provided to secure an accurate control of the water vapor added. As is obvious, the amount of water vapor added, either in the form of steam or otherwise, determines the final analysis of the reformed gas, but there has always heretofore been the possibility that if temperature conditions of the gas change the gas may take up or lose in moisture.

The importance of securing an exact proportion of the water vapor to the gas according to its analysis will be apparent when it is realized that if insufficient water vapor is present and the gas is subjected to reforming temperature the gas tends to crack, rather than reform, and if excess water vapor is present the reaction may proceed to a point where the formation of undesirable end products will occur.

When the gas is cracked the hydrocarbons are broken down into hydrogen and carbon (soot) as end products. The breakdown tends to proceed in steps, that is, the hydrocarbons first form some unsaturated compounds and may even produce higher hydrocarbons and hydrogen before the second step, that is, the complete separation of carbon and hydrogen, takes place. If the reaction time is insufficient, the gas tends to carry the said unsaturated compounds as impurities.

The cracking process is endothermic, that is, external heat must be supplied.

The type of action which is desired and which is obtained, according to the present invention, by providing the exact ratio of water vapor to the gas, is an incomplete combustion. As above explained, the end products are carbon monoxide and hydrogen according to the following equation:

$$C_nH_{(2n+2)} + (2n) H_2O = (n) CO_2 + (3n+1) H_2$$

It is difficult to stop oxidation at that exact point even if only a mild oxidizer, like water vapor, is used. Hence, an excess of water vapor results in the end products of the reaction carrying more or less $CO_2$ and water vapor, which are undesirable.

If an excess of water vapor is present a reaction different from the next above equation takes place. A typical reaction where an excess of water is present is as follows:

$$C_nH_{(2n+2)} + (2n) H_2O = (n) CO_2 + (3n+1) H_2$$

Obviously this results in the presence of carbon dioxide and if further excess of water vapor is present it passes through the reaction unchanged and is one of the end products. Both $CO_2$ and water vapor are highly undesirable where the final gas is employed as an atmosphere for the bright heat treatment of metal, that is, heat treating metals with bright surfaces without dulling or oxidizing those surfaces. A common example of bright heat treatment of metals is bright annealing of steel.

Metals with bright surfaces are, at the elevated temperatures at which the heat treatment takes place, peculiarly sensitive to carbon dioxide and water vapor, since both of these gaseous constituents tend to oxidize the surface of the metal and defeat the bright heat treatment.

Furthermore, metals with bright surfaces are, at the elevated temperatures at which heat treatment takes place, sensitive to hydrogen, which causes hydrogen embrittlement. Hence, excess of hydrogen is not desirable although, for the short time of heating and the specific relation of carbon monoxide and hydrogen which is present in the gas according to our invention, objectionable embrittlement is avoided.

The ratio of carbon monoxide to hydrogen gas in an atmosphere for heat treatment of steel is highly important because of the very distinct decarbonizing effect of the gas if the hydrogen is present in too great proportion. When carbon monoxide and hydrogen gas are in the approximate proportions produced by the process of my invention the carburizing effect of the carbon monoxide is substantially counteracted by the decarbonizing action of the hydrogen.

The carburizing reaction may be represented by the following equation:

$$2CO + 3Fe = Fe_3C + CO_2$$

The decarburizing effect of hydrogen is represented by the following equation:

$$Fe_3C + 2H_2 = CH_4 + Fe$$

If water vapor is present in the bright heat treatment of steel a reaction tends to occur which amounts to decarburization of a part and oxidization in part, according to the following equation:

$$2Fe_3C + 3H_2O = Fe_2O_3 + C_2H_6 + 4Fe$$

Thus it is seen that water vapor is a strong decarburizing agent. When it comes to the bright heat treatment of copper, brass, zinc, and so forth, other particular reactions must be avoider but, in general, a gas reformed according to my invention is generally suitable for such bright heat treatment, and in order to secure the reformed gas in substantially the condition desired, namely, in which the hydrocarbons and water vapor have reacted to produce carbon monoxide and hydrogen gas, a very careful proportioning of water vapor to gas is required to maintain the conditions for the specific reaction desired and the particular end products suitable for the bright heat treatment.

The principal object of the present invention is the provision of a means for and a method of accurately maintaining a certain proportion between two fluids to be mixed by passing one through the other so as to bring them to the same temperature and then bringing the two fluids into contact so as to secure a solution of the two which is saturated for that temperature. More specifically, an object of the present invention is to provide a means for and a method of reformation of a gas by the addition thereto of vapor from a liquid medium, which comprises passing the gas through the liquid medium to attain the temperature thereof, then bringing the gas into contact with said liquid medium so as to saturate the gas with the vapor of said medium, and then regulating and controlling the temperature of the liquid medium according to the amount of saturation desired. As is well known, according to the laws of saturation of gases with water vapor, assuming the pressure constant, that for any given temperature the gas will carry only a predetermined quantity of moisture, and with this in mind it is a further object of the present invention to provide a novel means for and method of humidifying a gas by first bringing the gas and water to the same temperature, then bringing them into intimate contact, as, for example, by bubbling the gas through the water to produce, for that temperature, a saturated solution of the water vapor in the gas, and then cooling the mixture slightly just before it passes into the reaction chamber, so as to produce 100% saturation at the slightly lowered temperature, thus taking care of possible slight deviations from actual complete saturation in the humidification chamber. In this way, by controlling and regulating the temperature of the water and the gas, the quantity of water vapor added to or mixed with the gas can be accurately determined and controlled.

These and other objects and advantages of the present invention will be apparent to those skilled in the art after a consideration of the following detailed description, taken in conjunction with the accompanying drawing.

The figure in the accompanying drawing is a self-explanatory schematic representation of the means and method exemplifying the present invention.

The reference numeral 1 indicates a constant temperature bath and gas humidifier, consisting of a water tank or container 2 having a water inlet 3 by which the container may be filled to the level indicated. A gauge glass 4 may be provided for the container 2 if desired. A number of coils 5 are disposed within the liquid in the tank 2 and are in communication with a gas inlet 6. The coils 5 terminate in a pipe section 8 which is provided with a plurality of openings 9 in the lower part of the tank. A gas outlet 12 leads from the upper portion of the tank 2 to a trap 15 which includes a baffle wall 16 and a line 17 that leads back to the tank 2 and which includes a liquid trap 18. The trap 15 is connected by a gas line 20 to a wet bulb thermometer chamber 21, and the latter is connected through a pipe 22 to a reaction tube or chamber 23. The pipe 22 passes through a cooling coil 24 just before it enters the chamber 23 and is provided with a drain 25 to dispose of any excess at this point. A wet bulb thermometer is indicated at 26 and has a fabric or porous member 27 dipping in the liquid in the chamber 21, and the dry bulb is indicated at 28 between the wet bulb thermometer and the cooling coil 24. Another thermometer 29 is disposed between the cooling coil 24 and the reaction chamber 23, and the difference between the readings of the thermometers 28 and 29 indicates the temperature drop at this point.

The water tank 2 has a heating unit 30, which may take any convenient form, and the reaction tube is also equipped with heating means 31. While we have indicated in the schematic drawing that the heating means 30 may be either gas or electric, it is to be understood that the present invention contemplates any means for bringing the water bath in the tank 2 to the desired temperature. For example, steam coils or the like (not shown) may be incorporated in the tank 2, or heated electric elements (not shown) may be incorporated in the bath, where it is dangerous or undesirable to have an external source of heat.

Our invention is dependent upon the well known laws of saturation of gases with water vapor in which, assuming a specific gas pressure for every temperature, a gas will carry only a predetermined quantity of moisture, if allowed to saturate itself at these various given temperatures.

In operation the heating means 30 is energized so as to heat the water in the tank or container 2, and then the gas at a regulated pressure is supplied to the inlet 6 and passes through the coils 5 down to the lower section 8 thereof. The sections 5 and 8 are so designed that by the time the gas reaches the openings 9 the gas is at the same temperature as the liquid in the tank 2. The gas is then allowed to bubble up from the openings 9 through the liquid in the tank 2 and into the space above the liquid level therein, the gas thus becoming saturated, or substantially so, with water vapor for the temperature at which the heating means 30 maintains the water bath and the pressure prevailing above the bath. As the gas passes through the cooling coil 24, its temperature drops to the dew point just before the mixture passes into the reaction chamber. This accommodates conditions where the gas approaching the reaction chamber is not quite 100% saturated, for by dropping the temperature to the dew point the gas does actually become 100% saturated, for the temperature of the mixture at that point. The drain 25 provides for the disposition of any condensate that may accumulate. It is to be understood that the refinement of the cooling coil 24 may not be necessary where the slight deviations from actual 100% saturation of the gas from the chamber 2 are not objectionable. However, the temperature control at the unit 24 is one means of absolutely insuring exactly the right amount of humidification. Usually a temperature drop of only one or two degrees is all that is necessary. Thus, according to well known physical and chemical laws, there is a definite proportion between the quantity of gas and the quantity of water vapor that the gas contains as the mixture passes into the reaction chamber 23, and the attainment and maintenance of the desired proportions is easily accomplished by the control of the temperature in the humidification tank 2 and at the cooling coil 24 the pressure being maintained constant.

It may be desirable not only to bubble the gas through the heated water, as shown in the drawing, but also to incorporate above the water a high efficiency film evaporator, and thereby use a combination of the two methods. Alternately, steam may be injected into the body of gas in contact with the free surface of the water. In fact, any means securing a saturated mixture of gas and water vapor at a given pressure and temperature may be utilized in this step of our invention, it being borne in mind at all times that the invention contemplates having the gas and the water at the same temperature, which, as previously stated, insures a constant proportion between the gas and water vapor for any given temperature and pressure, according to the law of humidification of gases. It will also be understood that although we have shown a simple coil to allow the gas to reach a temperature equilibrium with the water in the tank 2 before emerging from the openings 9 and bubbling up from the bottom of the coil through the water, any other means of heat transfer may be used to bring the gas and water to equilibrium temperature with each other before allowing contact with each other at the final predetermined temperature, which is under the control of the heating means 30.

As the gas mixture passes out of the container 2 and into the trap 15, any droplets of water or other liquid in the tank 2 will be separated out and returned to the tank through the liquid trip 18 and connection 17, the gas passing over the baffle 16 and on through the pipes 20 and 22 to the reaction tube.

The reaction in the tube or chamber 23 is according to the well known water-gas reaction mentioned above. The reaction chamber 23 is maintained at approximately 1800° F. and results in formation of a gas having from 50% to 75% hydrogen, 15% to 25% carbon monoxide, and quantities of nitrogen, as mentioned above.

The wet and dry bulb thermometers 26 and 28 are, of course, to measure the temperature and degree of saturation of the gas mixture as it passes from the constant temperature bath and gas humidifier 2 to the reaction chamber 23, and the thermometer 29 measures the temperature of the mixture just before it enters the reaction chamber. It is obvious that, if desired, instead of producing a slight drop in temperature of the mixture just before it enters the reaction chamber, the communicating tubes or passages from the humidification chamber 2 to the reaction chamber 23 may be kept at a constant temperature with the humidification water in the tank 2, so that there will be no condensation or change in saturation point of the gas as it passes from the bath 2 to the reaction chamber 23. If desired, also, these tubes and passages may be placed directly in the water in the tank 2.

It will be understood from the above description that, according to our invention, we can control the humidification of the gas and that, in turn, controls the final analysis of the gas by an extraordinary accuracy that cannot be approached by any other method of introducing water vapor into gas known to us. The law of saturation is extremely sensitive to temperature, and one of the well known means of getting very accurate constant temperature is through the medium of liquid baths. Furthermore, the bubbling through or bringing of the gas into contact with heated water, further insures constancy and accuracy of temperature control of the gas and water, and at the same time presents the maximum of surface of the gas to the maximum surface of the water, thereby insuring complete saturation before the gas leaves the humidification chamber 2.

It is to be understood, moreover, that our invention is not to be limited to securing an accurate humidification of a gas with water vapor, but, in fact, the principles of the present invention may be employed, for example, where it is desired to enrich the gas with certain types of oil. In that case, the oil selected would be the liquid in the chamber 2 and the gas bubbling up through the oil, being first brought to the same temperature as the latter, would be saturated for that temperature. Thus, as in the case of humidifying the gas with water vapor, the maintenance of the bath 2 at the desired temperature is an exact control of the proportions between the gas and the additive ingredient.

A constant pressure of the gas is maintained in the above process. This is easily accomplished by a pressure regulator at the outlet to the chamber 23. If desired, a pressure regulator at the inlet to the tube 6 may be provided, also a relief valve or seal may be employed at any suitable point, if desired.

What we claim, and desire to secure by Letters Patent is:

1. Means for reforming a fuel gas whereby it is rendered suitable for bright heat treatment of metals comprising the combination of a closed saturation chamber in which a substantially fixed charge of water is resident, means for maintaining the entire charge of water at a substantially uniform predetermined temperature, said chamber having a gas space above the charge of water, means for maintaining the gas in the gas space at a substantially predetermined pressure, means for introducing a fuel gas through intimate physical and thermal contact with the said charge of water whereby the gas assumes the temperature of the water and becomes saturated with water vapor and accumulates in the gas space the pressure and temperature of the saturated gas in the gas space being selected and maintained at respective values such that the vapor content of the gas is in substantially the right proportion to the combinable hydrocarbons of the gas to produce upon reforming a substantially complete reaction of all the water vapor with all of the hydrocarbons into carbon monoxide and hydrogen, and a reforming chamber connected to said gas space for receiving the saturated gas, said reforming chamber having means for maintaining a reforming temperature therein to reform the saturated gas.

2. The combination of claim 1 with means in advance of the reforming chamber for slightly reducing the temperature of the saturated gas to insure that the dewpoint has been attained.

3. The combination of claim 1 wherein the saturation chamber comprises a tank containing a relatively stationary charge of water in the bottom thereof and gas space in the top thereof and wherein the gas introducing means comprises a coiled tube extending through the charge of water to form a heat exchanger between the entering gas and water and comprises a perforated wall near the bottom of the tank through which the gas is passed and allowed to bubble up to the gas space.

4. Method of reforming fuel gas of known composition containing hydrocarbon constituents which are combinable with water vapor to render it suitable for use as an atmosphere for the bright heat treatment of metals which comprises intimately agitating the fuel gas in contact with a relatively stationary body of water to produce substantially complete saturation of the gas with water vapor at a predetermined temperature and a predetermined pressure, said temperature and pressure being selected at such values with respect to the combinable hydrocarbons present in the gas that the ratio of water vapor to said combinable hydrocarbons present in the saturated gas is substantially exact for complete reaction of all of the water vapor with all of the combustible hydrocarbon constituents to produce carbon monoxide and hydrogen, and then subjecting the saturated gas to reforming temperature to reform the hydrocarbons and water vapor into carbon monoxide and hydrogen.

5. Means for reforming a gas which contains hydrocarbon constituents combinable with the vapor of a liquid with which said constituents are to be combined by a definite reforming reaction into definite end products which comprises the combination of a tank adapted to contain a resident body of the said liquid, and having a gas space above the body of liquid, means for intimately agitating the gas in contact with the liquid in the tank to produce saturation of the gas vapor of the liquid at the same temperature as that of the liquid, the gas and liquid being in sufficient thermal contact to equalize their temperatures, means for heating the liquid to maintain a predetermined temperature thereof, means for maintaining the saturated gas in the gas space at a predetermined pressure, the temperature and pressure at which the gas is saturated being so selected with respect to the composition and quantity of the hydrocarbon constituents in the gas that substantially the exact ratio of vapor to combinable constituents of the gas required for complete reforming reaction without excess of vapor or combustible constituents is produced, and a combining chamber in which the desired reforming reaction is adapted to be produced, said chamber being connected to said gas space, said reforming chamber having heating means whereby the saturated gas is heated to the combining temperature in said chamber.

ROBERT G. GUTHRIE.
OSCAR J. WILBOR.